United States Patent
Kim et al.

(10) Patent No.: US 10,562,209 B2
(45) Date of Patent: Feb. 18, 2020

(54) DEPOSITION ASSEMBLY AND METHODS FOR DEPOSITING MOLD RELEASE LAYERS ON SUBSTRATES

(71) Applicant: The Aerospace Corporation, El Segundo, CA (US)

(72) Inventors: Hyun I. Kim, Brea, CA (US); Rafael J. Zaldivar, Huntington Beach, CA (US); James M. Helt, Playa Del Rey, CA (US)

(73) Assignee: The Aerospace Corporation, El Segundo, CA (US)

(*) Notice: Subject to any disclaimer, the term of this patent is extended or adjusted under 35 U.S.C. 154(b) by 193 days.

(21) Appl. No.: 15/016,118

(22) Filed: Feb. 4, 2016

(65) Prior Publication Data

US 2017/0225365 A1    Aug. 10, 2017

(51) Int. Cl.
| | | |
|---|---|---|
| *B05D 3/10* | (2006.01) | |
| *B05D 1/18* | (2006.01) | |
| *B05D 5/08* | (2006.01) | |
| *B29C 33/58* | (2006.01) | |
| *B29C 33/62* | (2006.01) | |

(52) U.S. Cl.
CPC ............ *B29C 33/58* (2013.01); *B05D 3/104* (2013.01); *B29C 33/62* (2013.01); *B05D 1/185* (2013.01); *B05D 5/083* (2013.01); *B05D 2203/35* (2013.01); *B29K 2909/08* (2013.01)

(58) Field of Classification Search
CPC ..... B29K 2909/08; B29C 33/58; B29C 33/62; B05D 2203/35; B05D 5/083; B05D 3/104; B05D 1/185
See application file for complete search history.

(56) References Cited

U.S. PATENT DOCUMENTS

| | | | |
|---|---|---|---|
| 4,418,641 A * | 12/1983 | Nakashima ........ | B01D 19/0021 118/402 |
| 5,443,901 A * | 8/1995 | Mino ..................... | B82Y 10/00 428/336 |
| 5,855,966 A | 1/1999 | Richards | |
| 6,627,302 B1 * | 9/2003 | Tang ..................... | G11B 5/725 428/212 |
| 8,496,863 B2 | 7/2013 | Hoghoj et al. | |
| 2006/0236929 A1 * | 10/2006 | Katsuoka ............ | C23C 18/1628 118/412 |
| 2007/0042139 A1 * | 2/2007 | Cooper .................. | C09D 5/22 428/29 |

(Continued)

*Primary Examiner* — Jose Hernandez-Diaz
(74) *Attorney, Agent, or Firm* — Manita Rawat; Duane Morris LLP

(57) ABSTRACT

A deposition assembly generally comprises a first deposition apparatus that is configured to receive a substrate, such as a glass mandrel. The first deposition apparatus is further configured to deposit a plurality of first monolayer molecules onto at least a surface of the substrate to generate a first coating structure on the substrate. A second deposition apparatus is coupled to the first deposition apparatus, and wherein the second deposition apparatus is configured to deposit a plurality of second monolayer molecules onto at least the surface of the substrate such that the second monolayer molecules are diffused through the first coating structure and at least one aperture is filled by at least one of the second monolayer molecules to generate at least one mold release layer on at least the surface of the substrate.

21 Claims, 4 Drawing Sheets

(56) References Cited

U.S. PATENT DOCUMENTS

2009/0061039 A1* 3/2009 Zhang ................ B29C 33/3857
　　　　　　　　　　　　　　　　　　　　　425/436 R
2009/0258048 A1　10/2009　Ward et al.

* cited by examiner

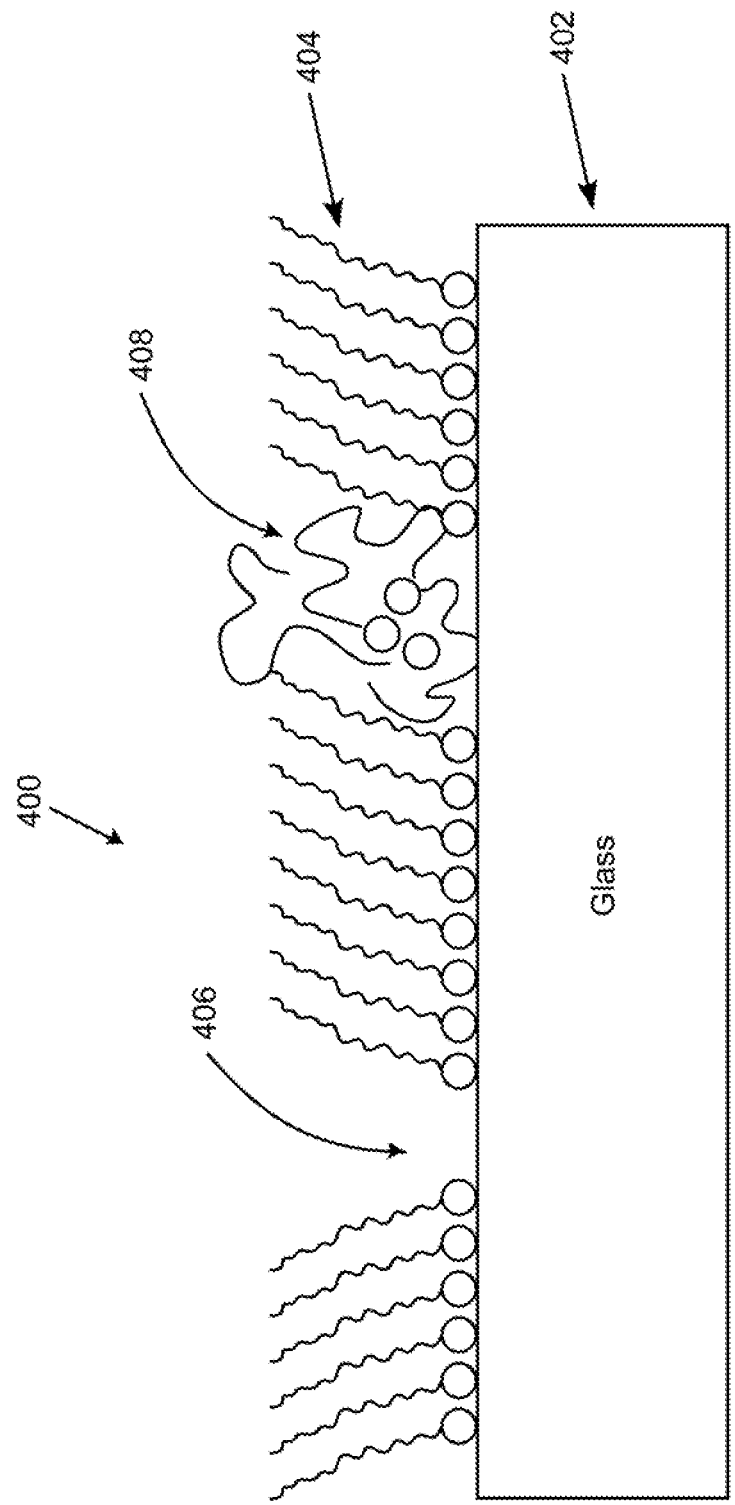

DEPOSITION ASSEMBLY AND METHODS FOR DEPOSITING MOLD RELEASE LAYERS ON SUBSTRATES

BACKGROUND

The field of the invention relates generally to systems and, more particularly, to deposition assemblies and methods for depositing at least one mold release layer, such as a self-assembled monolayer ("SAM"), on a substrate, such as a glass mandrel.

At least some known mold release layers, such as SAM, can be used for the manufacture of replicated optics. The molecular scale thickness of SAM coatings can be used to facilitate replicating the optical quality surface of a substrate, such as a glass mandrel, onto, for example, a resin-based mirror. However, deposition of a defect-free SAM over the macroscopic size of at least some known mirrors can be challenging. For example, there can be defect sites, such as pin holes or low density areas and grain boundaries, on the SAM. Permeation of the replicating resin through such defect sites can result in increased release force and increased local deformation of the replicated mirror. Additionally, a mold release coating can result in a significant material transfer of the release material onto the replicated surface, which may adversely impact post-processing of the surface.

BRIEF DESCRIPTION

The embodiments described herein provide a deposition assembly that can facilitate a dual dip deposition or coating process of a mold release layer, such as a self-assembled monolayer ("SAM"), onto a substrate such that the defects of the mold release layer can be substantially reinforced or inhibited. For example, in some embodiments, a deposition assembly is provided that includes a first deposition apparatus that is configured to receive a substrate, such as a glass mandrel. The first deposition apparatus is further configured to deposit a plurality of first monolayer molecules onto at least a surface of the substrate to generate a first coating structure on the substrate. A second deposition apparatus is coupled to the first deposition apparatus, and wherein the second deposition apparatus is configured to deposit a plurality of second monolayer molecules onto at least the surface of the substrate such that the second monolayer molecules are diffused through the first coating structure and at least one aperture is filled by at least one of the second monolayer molecules to generate at least one mold release layer on at least the surface of the substrate.

In other embodiments, a method for depositing at least one mold release layer on a substrate, such as a glass mandrel, is provided. The method includes cleaning a substrate using a cleaning apparatus and receiving the substrate via a first deposition apparatus that is coupled to the cleaning apparatus. A plurality of first monolayer molecules are deposited onto at least a surface of the substrate to generate a first coating structure on the substrate. The substrate is received via a second deposition apparatus that is coupled to the first deposition apparatus. A plurality of second monolayer molecules are deposited onto at least the surface of the substrate such that the second monolayer molecules are diffused through the first coating structure and at least one aperture is filled by at least one of the second monolayer molecules to generate at least one mold release layer on at least the surface of the substrate.

In some embodiments, a system is provided, wherein the system is configured to deposit at least one mold release layer on a substrate, such as a glass mandrel. The system includes a cleaning apparatus that is configured to clean a substrate. A deposition assembly is coupled to the cleaning apparatus, wherein the deposition assembly includes a first deposition apparatus that is configured to receive the substrate and to deposit a plurality of first monolayer molecules onto at least a surface of the substrate to generate a first coating structure on the substrate. The deposition assembly also includes a second deposition apparatus that is coupled to the first deposition apparatus. The second deposition apparatus is configured to deposit a plurality of second monolayer molecules onto at least the surface of the substrate such that the second monolayer molecules are diffused through the first coating structure and at least one aperture is filled by at least one of the second monolayer molecules to generate at least one mold release layer on at least the surface of the substrate.

BRIEF DESCRIPTION OF THE DRAWINGS

FIGS. 3A and 3B are block diagrams of an exemplary substructure that includes a substrate with at least one mold release layer deposited thereon using the system shown in FIG. 1.

DETAILED DESCRIPTION

Figure 1:
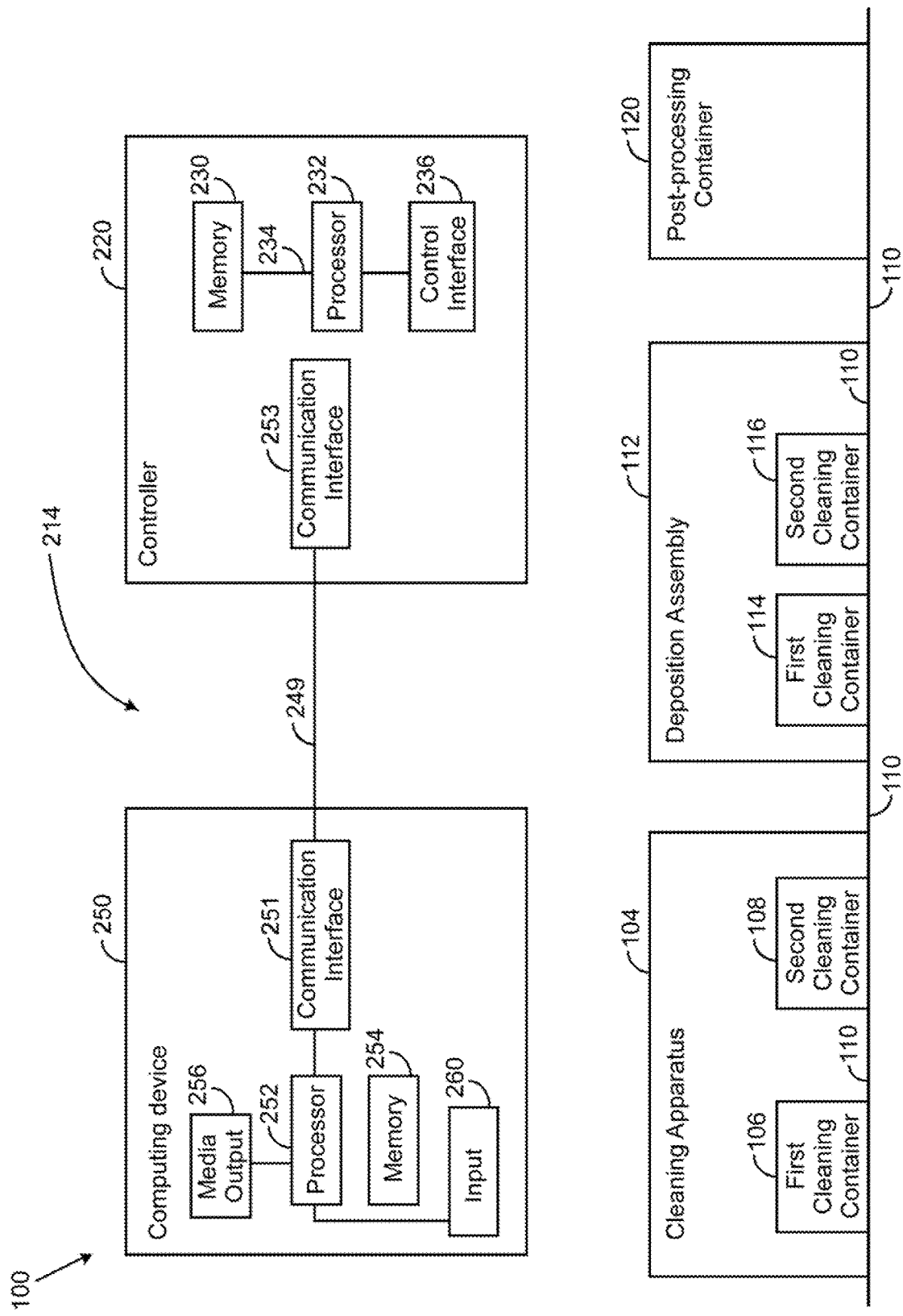
FIG. 1 is an exemplary system that includes a cleaning apparatus and a deposition assembly.

In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

This description of the exemplary embodiments is intended to be read in connection with the accompanying drawings, which are to be considered part of the entire written description. The drawings are not drawn to scale. In the various drawings, like reference numerals indicate like items, unless expressly indicated otherwise in the text.

As described above, deposition of a defect-free mold release layer, such as a self-assembled monolayer ("SAM"), over the macroscopic size of at least some known mirrors can be challenging because permeation of the replicating resin through defect sites can result in increased release force and increased local deformation of the replicated mirror. The embodiments described herein facilitate a dual dip deposition or coating process of a mold release layer, such as SAM, such that the defects of the mold release layer can be substantially reinforced or inhibited.

FIG. 1 illustrates a system 100 that can be used to deposit at least one mold release layer (not shown in FIG. 1), such as SAM, on a substrate (not shown in FIG. 1), such as a glass mandrel. In the exemplary embodiment, system 100 includes a buffer or cleaning apparatus 104 that is configured to receive the substrate and to prepare the substrate, such as to clean the substrate therein for further processing. For example, in some embodiments, cleaning apparatus 104 can include a first cleaning container 106 that is configured to contain acetone and/or isopropyl alcohol ("IPA") therein. In some embodiments, first cleaning container 106 can also contain a suitable sonication device (not shown) to facilitate sonication in first cleaning container 106. A second cleaning container 108 is coupled to and/or positioned adjacent to first cleaning container 106 via, for example, a conveyor 110. In some embodiments, second cleaning container 108 can be configured to contain a Piranah solution (2:1 mixture of sulfuric acid and hydrogen peroxide) therein.

A deposition assembly 112 is coupled to and/or positioned adjacent to cleaning apparatus 104 via, for example, conveyor 110. In some embodiments, deposition assembly 112 includes a first deposition apparatus 114 that is configured to contain solution therein that includes a plurality of first monolayer molecules, such as oligomer molecules. For example, the first monolayer molecules can include oligomer molecules, such as hydrocarbons and fluorocarbons. In some embodiments, the first monolayer molecules can include a long chain perfluoropolyether ("PFPE") with a triethoxysilane terminal group having, for example, a chain length of approximately 15 nanometers ("nm"). In some embodiments, first deposition apparatus 114 can include a suitable sonication device (not shown) to facilitate sonication therein.

In some embodiments, deposition assembly 112 also includes a second deposition apparatus 116 coupled to and/or positioned adjacent to first deposition apparatus 114 via, for example, conveyor 110. Second deposition apparatus 116, in some embodiments, includes a solution therein that includes a plurality of second monolayer molecules, such as oligomer molecules. For example, the second monolayer molecules can include oligomer molecules, such as hydrocarbons and fluorocarbons. In some embodiments, the second monolayer molecules can include a short chain fluorocarbon with a triethoxysilane terminal group having, for example, a chain length of approximately 1 nm. In some embodiments, second deposition apparatus 116 can include a suitable sonication device (not shown) to facilitate sonication therein.

In some embodiments, a post-processing container or chamber 120 is coupled to deposition assembly 112 via, for example, conveyor 110. In some embodiments, post-processing container can include a vacuum (not shown), a heater (not shown), and/or a heat exchanger (not shown) to facilitate providing heat energy to the substrate such that the substrate can be heated.

In some embodiments, a control system 214 is coupled to cleaning apparatus 104, deposition assembly 112, and/or post-processing container 120. For example, control system 214 can be configured to control various operational parameters, such as temperature and pressure, within cleaning apparatus 104, deposition assembly 112, and/or post-processing container 120. In some embodiments, control system 214 includes a controller 220 that is operatively coupled to vary the operation of cleaning apparatus 104, deposition assembly 112, and/or post-processing container 120 as a function of values determined from sensors (not shown) responsive to parameters such as temperature and pressure, as well as rates of change of such parameters, according to a programmed control scheme or algorithm. In some embodiments, controller 220 is enabled to facilitate operative features of each of the valves, via features that include, without limitation, receiving inputs, transmitting outputs, and transmitting opening and closing commands. For example, controller 220 is enabled to independently control the pressure within each of cleaning apparatus 104, deposition assembly 112, and/or post-processing container 120, for example. Similarly, controller 220 can be coupled to the heat exchanger in post-processing chamber 120, for example, such that controller 220 is enabled to facilitate operative features of the heat exchanger.

In some embodiments, controller 220 can be a real-time controller and can include any suitable processor-based or microprocessor-based system, such as a computer system, that includes microcontrollers, reduced instruction set circuits ("RISC"), application-specific integrated circuits ("ASICs"), logic circuits, and/or any other circuit or processor that is capable of executing the functions described herein. In one embodiment, controller 220 can be a microprocessor that includes read-only memory ("ROM") and/or random access memory ("RAM"), such as, for example, a 32 bit microcomputer with 2 Mbit ROM and 64 Kbit RAM. As used herein, the term "real-time" refers to outcomes occurring in a substantially short period of time after a change in the inputs affect the outcome, with the time period being a design parameter that can be selected based on the importance of the outcome and/or the capability of the system processing the inputs to generate the outcome.

In some embodiments, controller 220 includes a memory device 230 that stores executable instructions and/or one or more operating parameters representing and/or indicating an operating condition of cleaning apparatus 104, deposition assembly 112, and/or post-processing container 120. Controller 220 also includes a processor 232 that is coupled to memory device 230 via a system bus 234. In some embodiments, processor 232 can include a processing unit, such as, without limitation, an integrated circuit ("IC"), an application specific integrated circuit ("ASIC"), a microcomputer, a programmable logic controller ("PLC"), and/or any other programmable circuit. Alternatively, processor 232 can include multiple processing units (e.g., in a multi-core configuration). The above examples are exemplary only, and thus are not intended to limit in any way the definition and/or meaning of the term "processor."

Moreover, in some embodiments, controller 220 includes a control interface 236 that is configured to couple to cleaning apparatus 104, deposition assembly 112, and/or post-processing container 120. More specifically, control interface 236 is coupled to components, such as the valves and/or heat exchangers within cleaning apparatus 104, deposition assembly 112, and/or post-processing container 120, and control interface 236 is configured to control an operation of the valves and/or heart exchangers. For example, processor 232 can be programmed to generate one or more control parameters that are transmitted to control interface 236. Control interface 236 can then transmit a control parameter to modulate, open, or close the valves, for example.

Various connections are available between control interface 236 and cleaning apparatus 104, deposition assembly 112, and/or post-processing container 120. Such connections can include, without limitation, an electrical conductor, a low-level serial data connection, such as Recommended Standard ("RS") 232 or RS-485, a high-level serial data connection, such as USB, a field bus, a PROFIBUS®, or Institute of Electrical and Electronics Engineers ("IEEE") 1394 (a/k/a FIREWIRE), a parallel data connection, such as IEEE 1284 or IEEE 488, a short-range wireless communication channel (personal area network) such as BLUETOOTH, and/or a private (e.g., inaccessible outside system 100) network connection, whether wired or wireless. PROFIBUS is a registered trademark of Profibus Trade Organization of Scottsdale, Ariz. IEEE is a registered trademark of the Institute of Electrical and Electronics Engineers, Inc., of New York, N.Y. BLUETOOTH is a registered trademark of Bluetooth SIG, Inc. of Kirkland, Wash.

In some embodiments, control system 214 can also include a user computing device 250 that is coupled to controller 220 via a network 249. More specifically, computing device 250 includes a communication interface 251 that is coupled to a communication interface 253 contained within controller 220. User computing device 250 includes a processor 252 for executing instructions. In some embodiments, executable instructions are stored in a memory device 254. Processor 252 can include one or more processing units (e.g., in a multi-core configuration). Memory device 254 is any device allowing information, such as executable instructions and/or other data, to be stored and retrieved. User computing device 250 also includes at least one media output component 256 for use in presenting information to a user. Media output component 256 is any component capable of conveying information to the user. Media output component 256 can include, without limitation, a display device (not shown) (e.g., a liquid crystal display (LCD), an organic light emitting diode (OLED) display, or an audio output device (e.g., a speaker or headphones)).

Moreover, in some embodiments, user computing device 250 includes an input interface 260 for receiving input from a user. Input interface 260 can include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, can function as both an output device of media output component 256 and input interface 260.

During operation, system 100 facilitates a dual dip deposition of the mold release layer, such as SAM, onto the substrate such that the defects of the mold release layer can be substantially reinforced or inhibited. As explained in more detail below with respect to FIGS. 2, 3A and 3B, first deposition apparatus 114 deposits the first monolayer molecules onto at least a surface of the substrate to generate a first coating structure on the substrate and second deposition apparatus 116 deposits the second monolayer molecules onto at least the surface of the substrate such that the second monolayer molecules are diffused through the first coating structure and at least one aperture (not shown in FIG. 1) is filled by at least one of the second monolayer molecules to generate at least one mold release layer on at least the surface of the substrate.

Figure 2:
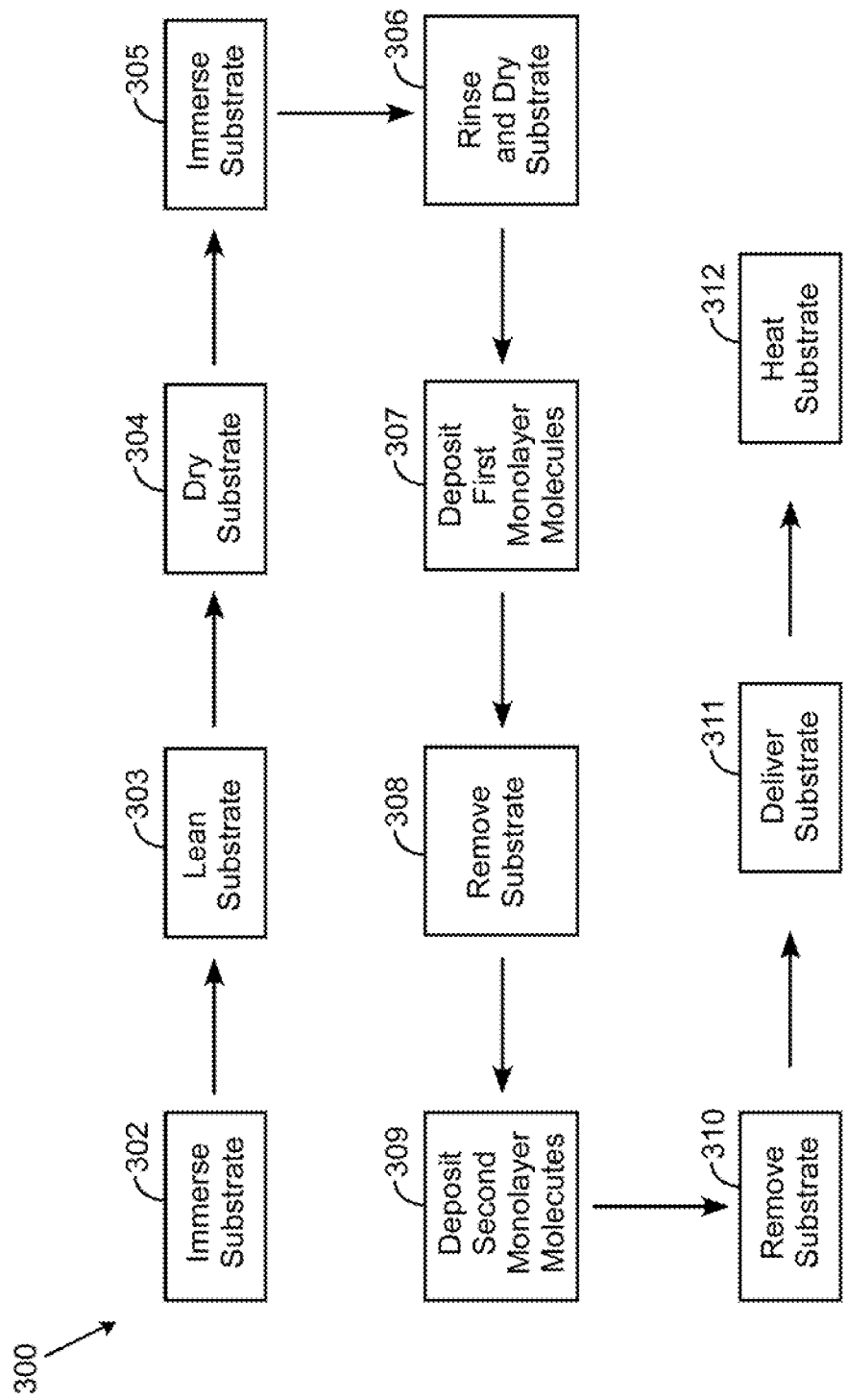
FIG. 2 is a flow diagram of an exemplary method for depositing at least one mold release layer on a substrate using the system shown in FIG. 1.
Figure 3B:
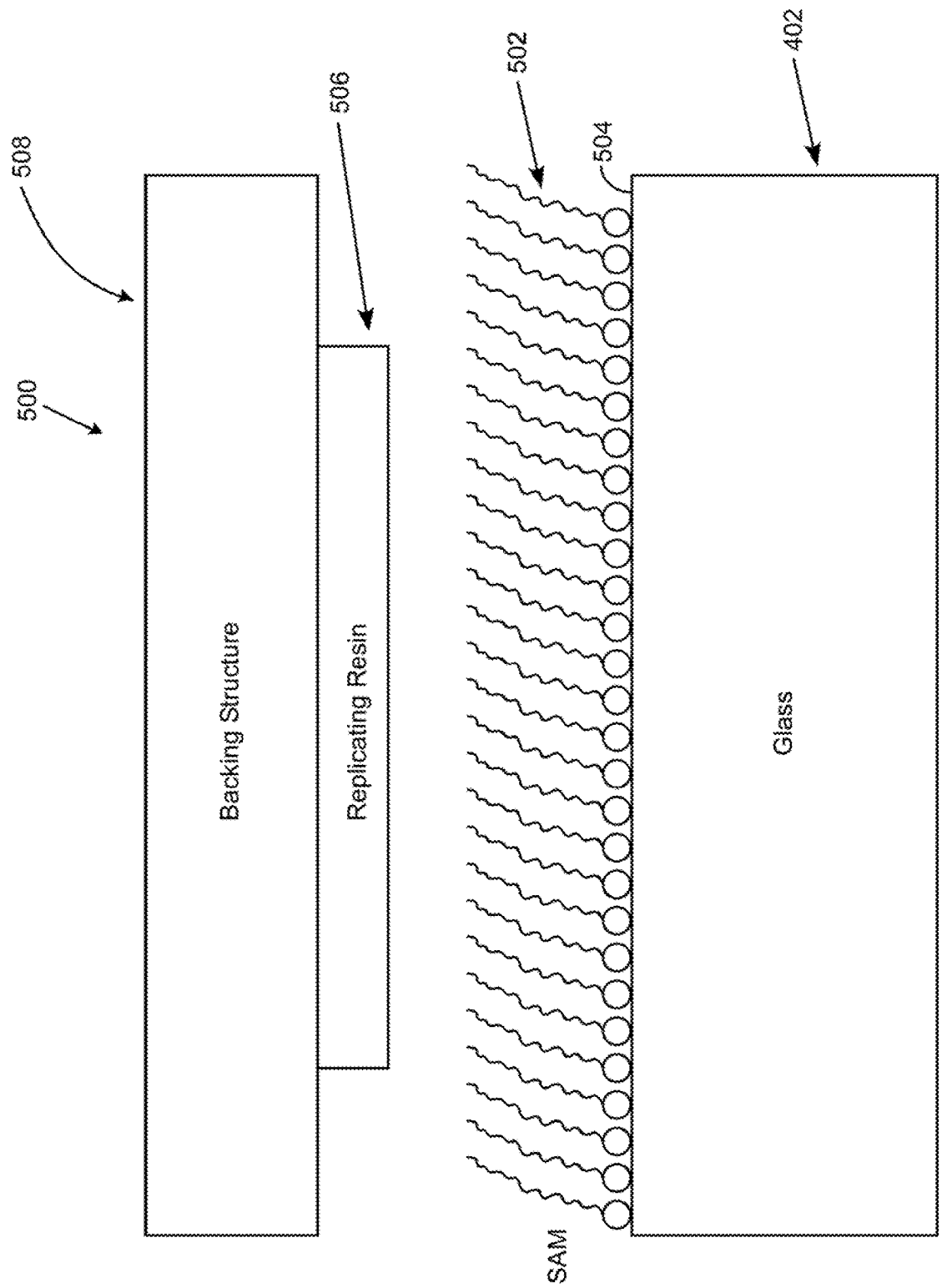

FIG. 2 is a flow diagram 300 of an exemplary method for depositing at least one mold release layer, such as SAM, on a substrate, such as a glass mandrel using system 100 (shown in FIG. 1). FIGS. 3A and 3B illustrate a substructure 400 and a final substructure or product 500, respectively, that are created when performing the method shown in diagram 300.

Referring to FIG. 2, in step 302, a substrate, such as a glass mandrel 402 (shown in FIGS. 3A and 3B) is delivered to or immersed in first cleaning container 106 (shown in FIG. 1). In step 303, glass mandrel 402 is cleaned. For example, in some embodiments, when performing step 303, glass mandrel 402 can be cleaned by sonication in acetone for approximately ten minutes followed by sonication in IPA for approximately ten minutes. In step 304, glass mandrel 402 is dried. For example, in some embodiments, glass mandrel 402 can be dried by performing a nitrogen gas ("$N_2$") blow off.

In step 305, glass mandrel 402 is delivered to or immersed in second cleaning container 108 (shown in FIG. 1). For example, in some embodiments, glass mandrel 402 is immersed in the Piranah solution for approximately twenty minutes. In step 306, glass mandrel 402 is rinsed and dried. In some embodiments, glass mandrel 402 can be rinsed with distilled water and then dried using $N_2$.

After glass mandrel 402 is thoroughly cleaned using steps 302-306, then the first monolayer molecules are deposited onto at least a surface of glass mandrel 402, in step 307, to generate a first coating structure on glass mandrel 402. For example, in some embodiments, glass mandrel 402 is immediately delivered or immersed into first deposition apparatus 114 (shown in FIG. 1), wherein glass mandrel 402 is immersed into a freshly prepared solution of the first monolayer molecules. In some embodiments, glass mandrel 402 can be soaked in the solution for approximately an hour to establish an initial coating structure. In some embodiments, glass mandrel 402 could be sonicated in the solution for approximately ten minutes to facilitate the order and density of the initial coating. In some embodiments, glass mandrel 402 can be soaked in the solution for another hour to enable the terminal groups to react with the surface of glass mandrel 402 and with neighboring molecules.

After performing step 307, as shown in FIG. 3A, an initial coating structure of at least one mold release layer, such as SAM 404, can form on glass mandrel 402. When this initial coating structure is formed, there may be at least one aperture, such as at least one pinhole or low density area 406 that is included within the initial coating structure. In addition, the initial coating structure may include loosely bound self-polymerization 408 that could cause significant material transfer and degradation.

Referring to FIG. 2, in order to fill the aperture(s) 406 (shown in FIG. 3A) and inhibit the loosely bound self-polymerization 408 (shown in FIG. 3A) additional processing of glass mandrel 402 is performed. For example, in step 308, glass mandrel 402 is removed from the solution in first deposition apparatus 114 and, in step 309, the second monolayer molecules are deposited onto at least a surface of glass mandrel 402 in second deposition apparatus 116 (shown in FIG. 1). When performing step 309, in some embodiments, glass mandrel 402 can be immediately immersed in the solution in second deposition apparatus 116 that includes second monolayer molecules. In some embodiments, glass mandrel 402 can be sonicated in the solution for approximately ten minutes to facilitate the diffusion of smaller molecules through the initial coating structure and displace any weakly absorbed molecules and fill the aperture (s). In some embodiments, glass mandrel 402 can soak within the solution for an hour to enable the infused molecules to chemically bond to the surface of glass mandrel 402 and to crosslink.

In step 310, glass mandrel 402 is removed from second deposition apparatus 116. In step 311, glass mandrel 402 is delivered to post-processing container 120 (shown in FIG. 1). In step 312, glass mandrel 402 is heated within post-processing container 120. In some embodiments, glass mandrel 402 can be heated at 120 degrees Celsius for approximately an hour.

Referring to FIG. 3B, after performing steps 302 to 312, final substructure or product 500 is formed that includes glass mandrel 402 having a SAM layer 502 deposited on at least a surface 504 of glass mandrel 402, wherein defects of SAM layer 502 are substantially reinforced or inhibited. For example, apertures, such as pinholes or low density areas are inhibited and loosely bound self-polymerization is prevented. Substructure 500 can also include a replicating resin 506 and backing structure 508.

Exemplary embodiments of the assemblies, systems, and methods are described above in detail. The assemblies, systems, and methods are not limited to the specific embodiments described herein, but rather, components of the assemblies, systems and/or steps of the method may be utilized independently and separately from other components and/or steps described herein. For example, embodiments of the deposition assembly and system may also be used in combination with other systems and methods, and is not limited to practice with only a system as described herein. Rather, the exemplary embodiment can be implemented and utilized in connection with many other systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A deposition assembly comprising:
    a first deposition apparatus that is configured to receive a substrate and to deposit a plurality of first monolayer molecules onto at least a surface of the substrate to generate a first coating structure on the substrate that includes at least one aperture within the first coating structure; and
    a second deposition apparatus coupled to said first deposition apparatus, wherein said second deposition apparatus is configured to deposit a plurality of second monolayer molecules onto at least the surface of the substrate such that the plurality of second monolayer molecules are diffused through the first coating structure filling the at least one aperture with at least one of the plurality of second monolayer molecules to generate at least one mold release layer on at least the surface of the substrate, wherein said second deposition apparatus is configured to deposit the plurality of second monolayer molecules by being configured to:
        contain a solution of the plurality of second monolayer molecules therein;
        facilitate the immediate immersion of the substrate into the solution; and
        sonicate the substrate while immersed in the solution for a predefined period of time to fill the at least one aperture.

2. The deposition assembly of claim 1, wherein the plurality of first monolayer molecules and the plurality of second monolayer molecules include oligomer molecules.

3. The deposition assembly of claim 2, wherein the oligomer molecules includes one of hydrocarbons or fluorocarbons.

4. The deposition assembly of claim 1, wherein the plurality of first monolayer molecules include a perfluoropolyether ("PFPE") with a triethoxysilane terminal group.

5. The deposition assembly of claim 1, wherein the plurality of second monolayer molecules include a fluorocarbon with a triethoxysilane terminal group.

6. The deposition assembly of claim 1, wherein said first deposition apparatus is configured to deposit the plurality of first monolayer molecules by being configured to:
    contain a solution of the plurality of first monolayer molecules; and
    facilitate the immersion of the substrate into the solution.

7. The deposition assembly of claim 1, wherein said second deposition apparatus is configured to deposit the plurality of second monolayer molecules by being further configured to:
    facilitate the soaking of the substrate within the solution for a predefined period of time.

8. A system configured to deposit at least one mold release layer on a substrate, said system comprising:
    a cleaning apparatus configured to clean a substrate; and
    a deposition assembly coupled to said cleaning apparatus, wherein said deposition assembly comprises:
        a first deposition apparatus that is configured to receive the substrate and to deposit a plurality of first monolayer molecules onto at least a surface of the substrate to generate a first coating structure on the substrate that includes at least one substrate within the first coating structure; and
        a second deposition apparatus coupled to said first deposition apparatus, wherein said second deposition apparatus is configured to deposit a plurality of second monolayer molecules onto at least the surface of the substrate such that the plurality of second monolayer molecules are diffused through the first coating structure filling the at least one aperture with at least one of the plurality of second monolayer molecules to generate at least one mold release layer on at least the surface of the substrate, wherein said second deposition apparatus is configured to deposit the plurality of second monolayer molecules by being configured to:
            contain a solution of the plurality of second monolayer molecules therein;
            facilitate the immersion of the substrate into the solution; and
            sonicate the substrate while immersed in the solution for a predefined period of time to fill the at least one aperture.

9. The system of claim 8, wherein the plurality of first monolayer molecules and the plurality of second monolayer molecules include oligomer molecules.

10. The system of claim 8, wherein the plurality of first monolayer molecules include a perfluoropolyether ("PFPE") with a triethoxysilane terminal group and wherein the plurality of second monolayer molecules include a fluorocarbon with a triethoxysilane terminal group.

11. The system of claim 8, wherein said first deposition apparatus is configured to deposit the plurality of first monolayer molecules by being configured to:
    contain a solution of the plurality of first monolayer molecules; and
    facilitate the immersion of the substrate into the solution.

12. The system of claim 8, wherein said second deposition apparatus is configured to deposit the plurality of second monolayer molecules by being further configured to:

facilitate the soaking of the substrate within the solution for a predefined period of time.

13. The system of claim 8, wherein the substrate is a glass mandrel.

14. A method for depositing at least one mold release layer on a substrate, said method comprising:

cleaning a substrate using a cleaning assembly;

receiving the substrate via a first deposition apparatus that is coupled to the cleaning assembly;

depositing a plurality of first monolayer molecules onto at least a surface of the substrate to generate a first coating structure on the substrate that includes at least one aperture within the first coating structure;

receiving the substrate via a second deposition apparatus that is coupled to the first deposition apparatus; and depositing a plurality of second monolayer molecules onto at least the surface of the substrate such that the plurality of second monolayer molecules are diffused through the first coating structure filling the at least one aperture with at least one of the plurality of second monolayer molecules to generate at least one mold release layer on at least the surface of the substrate, wherein depositing the plurality of second monolayer molecules comprises:

containing a solution of the plurality of second monolayer molecules within the second deposition apparatus;

immersing the substrate immediately into the solution; and sonicating the substrate while immersed in the solution for a predefined period of time to fill the at least one aperture.

15. The method of claim 14, wherein depositing a plurality of first monolayer molecules comprises depositing a plurality of first monolayer molecules that include a perfluoropolyether ("PFPE") with a triethoxysilane terminal group.

16. The method of claim 14, wherein depositing a plurality of second monolayer molecules comprises depositing a plurality of second monolayer molecules that include oligomer molecules.

17. The method of claim 14, wherein depositing a plurality of first monolayer molecules comprises depositing a plurality of first monolayer molecules that include oligomer molecules.

18. The method of claim 17, wherein the oligomer molecules includes one of hydrocarbons or fluorocarbons.

19. The method of claim 14, wherein depositing a plurality of second monolayer molecules comprises depositing a plurality of second monolayer molecules that include a fluorocarbon with a triethoxysilane terminal group.

20. The method of claim 14, wherein depositing a plurality of first monolayer molecules comprises:

containing a solution of the plurality of first monolayer molecules within the first deposition apparatus; and immersing the substrate into the solution.

21. The method of claim 14, wherein depositing a plurality of second monolayer molecules further comprises:

soaking the substrate within the solution for a predefined period of time.

* * * * *